United States Patent
Eick et al.

(10) Patent No.: US 9,529,102 B2
(45) Date of Patent: Dec. 27, 2016

(54) CATERPILLAR-STYLE SEISMIC DATA ACQUISITION USING AUTONOMOUS, CONTINUOUSLY RECORDING SEISMIC DATA RECORDERS

(75) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 124 days.

(21) Appl. No.: 13/090,748

(22) Filed: Apr. 20, 2011

(65) Prior Publication Data

US 2012/0051181 A1    Mar. 1, 2012

Related U.S. Application Data

(60) Provisional application No. 61/330,049, filed on Apr. 30, 2010.

(51) Int. Cl.
*G01V 1/20* (2006.01)
(52) U.S. Cl.
CPC .................................. *G01V 1/20* (2013.01)
(58) Field of Classification Search
CPC ........................................................ G01V 1/20
USPC .............................................. 702/14; 367/56
See application file for complete search history.

(56) References Cited

U.S. PATENT DOCUMENTS

| | | | |
|---|---|---|---|
| 4,879,696 A * | 11/1989 | Kostelnicek | G01V 1/242 346/33 C |
| 5,715,213 A | 2/1998 | Allen | |
| 5,719,821 A | 2/1998 | Sallas et al. | |
| 6,002,640 A | 12/1999 | Harmon | |
| 6,182,014 B1 | 1/2001 | Kenyon et al. | |
| 6,327,537 B1 | 12/2001 | Ikelle | |
| 6,418,079 B1 | 7/2002 | Fleure | |
| 6,754,590 B1 | 6/2004 | Moldoveanu | |
| 6,882,938 B2 | 4/2005 | Vaage et al. | |
| 6,934,219 B2 | 8/2005 | Burkholder et al. | |
| 7,292,943 B2 | 11/2007 | Elder et al. | |
| 7,295,490 B1 | 11/2007 | Chiu et al. | |
| 7,499,374 B2 | 3/2009 | Ferber | |
| 7,515,505 B2 | 4/2009 | Krohn et al. | |
| 2007/0032959 A1 | 2/2007 | Jaulin et al. | |

(Continued)

FOREIGN PATENT DOCUMENTS

WO    2009038769    3/2009

OTHER PUBLICATIONS

Luc T. Ikelle and Kyoung-Jin Lee, "Multi-Shooting Method for Simulating Seismic Surveys: Application to 3D Finite-Difference Modeling", 2000 Expanded Abstracts, 4 pages.

(Continued)

*Primary Examiner* — Daniel L Murphy
(74) *Attorney, Agent, or Firm* — ConocoPhillips Company

(57) ABSTRACT

The invention relates to recording seismic data with autonomous seismic data recorders in a pattern where the recorders are deployed in a compact geographical array having a low aspect ratio keeping the recorders closer to the seismic source trucks and requiring fewer total recorders. The recorders are deployed to cover an active listening patch and the seismic source trucks progress from shot point to shot point within a defined source path that provides for a pattern of recorder movements from behind the active listening patch to a location in front of the active patch.

10 Claims, 5 Drawing Sheets

(56) References Cited

U.S. PATENT DOCUMENTS

| | | |
|---|---|---|
| 2008/0114548 A1 | 5/2008 | Pavel et al. |
| 2008/0144438 A1 | 6/2008 | Ferber |
| 2008/0219094 A1 | 9/2008 | Barakat |
| 2010/0039892 A1 | 2/2010 | Ray et al. |

OTHER PUBLICATIONS

PCT International Search Report—PCT/US2011/033439 (PCT/ISA210) Dated Jul. 28, 2011.

\* cited by examiner

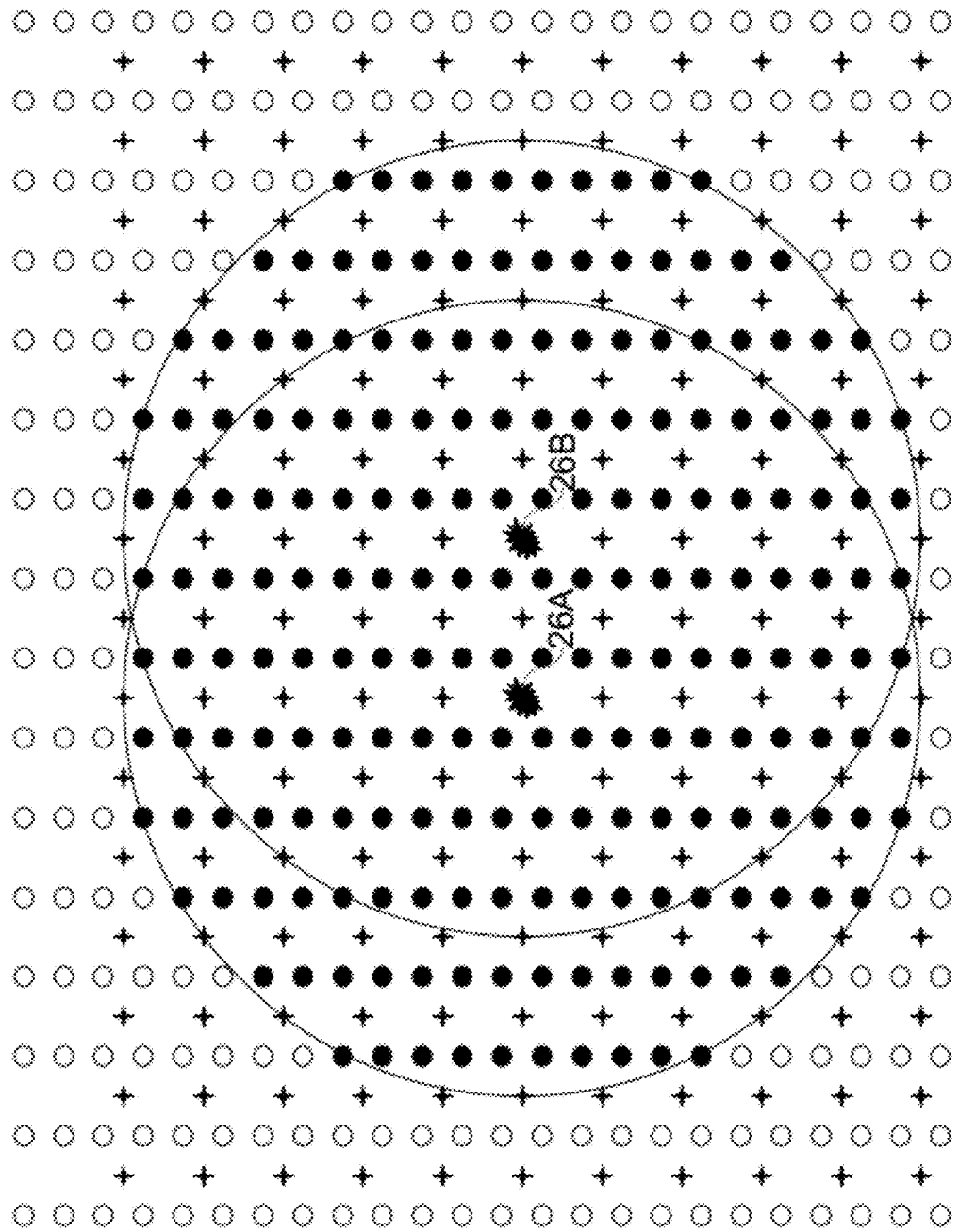

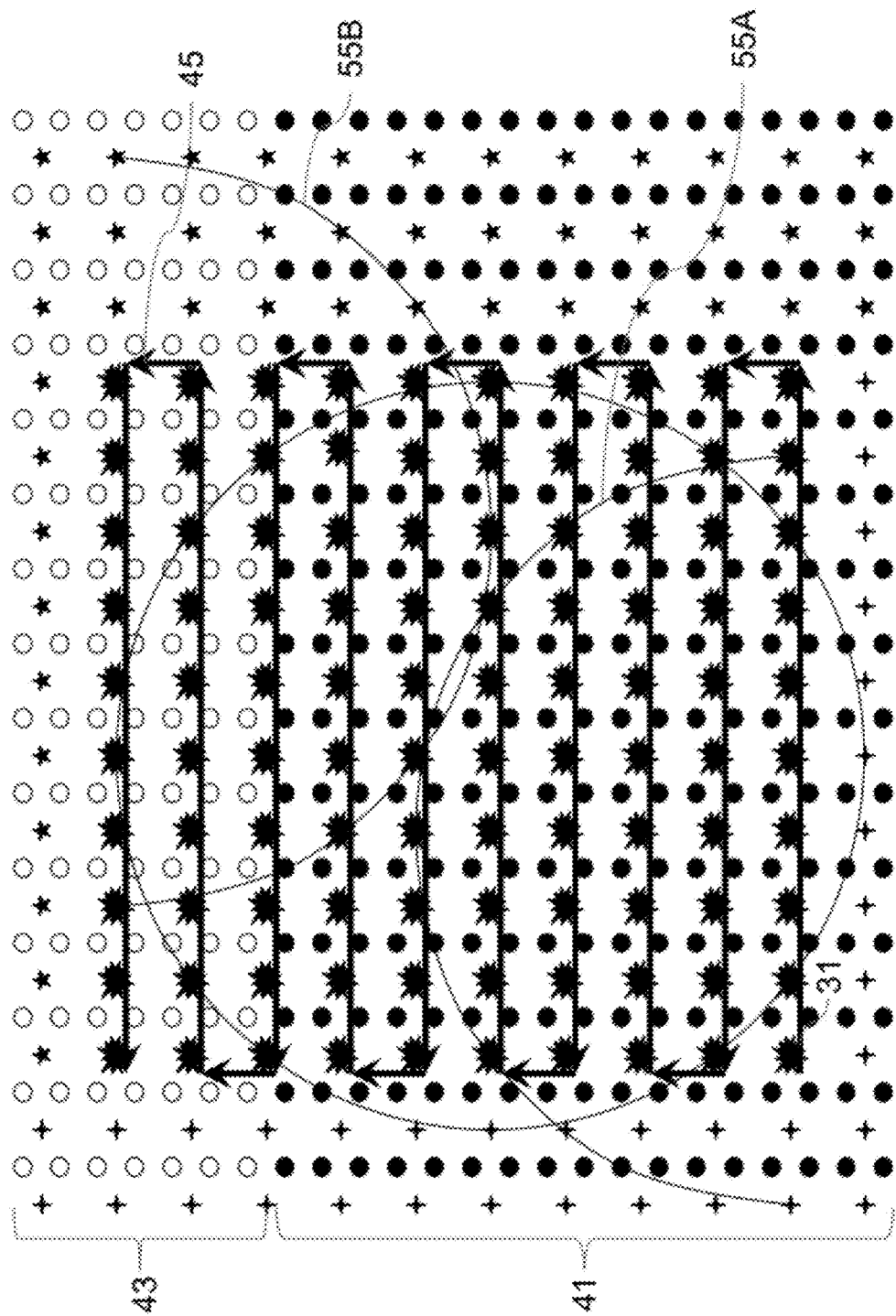

CATERPILLAR-STYLE SEISMIC DATA ACQUISITION USING AUTONOMOUS, CONTINUOUSLY RECORDING SEISMIC DATA RECORDERS

CROSS-REFERENCE TO RELATED APPLICATIONS

This application is a non-provisional application which claims benefit under 35 USC §119(e) to U.S. Provisional Application Ser. No. 61/330,049 filed Apr. 30, 2010, entitled "CATERPILLAR-STYLE SEISMIC DATA ACQUISITION USING AUTONOMOUS, CONTINUOUSLY RECORDING SEISMIC DATA RECORDERS", which is incorporated herein in its entirety.

STATEMENT REGARDING FEDERALLY SPONSORED RESEARCH OR DEVELOPMENT

None.

FIELD OF THE INVENTION

This invention relates generally to a system and method for seismic data acquisition.

BACKGROUND OF THE INVENTION

In the process of acquiring seismic data within a survey area, shot points and listening points are laid out typically in a grid like fashion with listening points in lines called receiver lines and shot points in lines called source lines. Source lines and receiver lines are also typically perpendicular or at some nominal angle to one another. It is also common that no shot point is directly on a listening point. The design of the survey is a balance between resolution and cost where more shot points and listening points provide higher resolution at higher cost although terrain, topography and structures at the surface must also be accommodated.

It should be understood that a survey is rarely conducted where an autonomous recorder is positioned at every listening point during the entire survey. Typically, the survey covers an area so large that most listening points are out of the range of seismic energy being broadcast from any shot point in the survey. Thus, as one would expect, a survey begins with laying out the autonomous recorders within range of the first shot points and then continually moving autonomous recorders that fall out of the range to the front of the survey as the seismic source trucks progress from shot point to shot point shaking each one. However, with conventional cable geophones, the conventional pattern of progression has been to lay out long cables of geophones to extend the full length of the receiver lines and also to cover the width of the range of useful, recordable seismic energy. Thus, if the range for a useful, recordable signal is 12 receiver lines wide, for example, then normally 13 cables worth of equipment are brought to the field and laid out for the survey. In the conventional pattern, the source trucks move from shot point to shot point along and within a "valley" between two adjacent receiver lines so that the entire signal at each shot point is captured by geophones in the field. This is normally called "template centered shooting". When the source truck gets to the end of a valley, it moves over to the next adjacent valley and progresses back toward the first end of the survey area. If several seismic trucks are used concurrently, then each truck would typically stay within a single valley and progress along in adjacent valleys but generally side-by-side until all the shot points in each valley were complete and then all move to the next set of adjacent valleys. When the seismic source trucks reach the ends of the first valley or valleys to move to a second set of valleys, if one or more lines of geophones become out of range, they are collected up and moved to the next open receiver lines. By the time the seismic source trucks reach the ends of the second set of valleys to move over to the third set of valleys, the receiver lines are to be ready and in place for steady progression and efficiency.

Now, with the advent and wider use of autonomous, continuously recording seismic data recorders, having geophones strung along with cables are less common and not required. But the procedure for laying out the autonomous recorders and shaking shot points has not changed.

SUMMARY OF THE INVENTION

This invention relates to a process for collecting seismic data for a survey area where source trucks shake shot points and autonomous, continuously recording seismic recorders record data at listening points. The process comprises creating a geophysical survey layout for the survey area including defining individual locations for each of a plurality of shot points and each of a plurality of listening points and estimating the average number of shot points that will be shaken during a normal work day wherein the term "active shot points" means shot points that are currently being shaken and "active source patch" means a generally contiguous geographical array of shot points within the survey area that are expected to be shaken during a normal work day where the active patch moves through the survey area and may change shape and dimension throughout the survey. Within the survey area, a series of vibe paths are selected within which one or more source trucks are to progress from shot point to shot point through all of the shot points within the vibe path and within which the active patch will progress through the survey, wherein the vibe paths are selected to have a nominal width dimension that will, combined with the average number of shot points estimated to be shaken during a normal work day, define an active patch to have an aspect ratio of its largest transverse dimension relative to its smallest transverse dimension to be less than five to one, wherein "listening paths" comprise the listening points within the vibe path and on either side of the vibe path within range of shot points within the vibe path where useful, recordable seismic data may be recorded and "active listening patch" means the listening points within the listening path range of the active shot points and comprise listening points so that listening points in the active listening patch are receiving or will soon receive useful, recordable seismic data. A plurality of autonomous, continuously recording seismic recorders are deployed to the active listening patch and the autonomous, continuously recording seismic recorders that are behind the active listening patch are retrieved. The retrieved autonomous, continuously recording seismic recorders are re-deployed to listening points in front of the active listening patch within the listening path.

In one particular characteristic of the present invention, the receiver points are arranged in receiver lines and the source path requires that seismic source trucks cross receiver lines to move to shot points in the active source patch.

In another characteristic of the present invention, the data stored in the memory of the autonomous seismic data recorders is downloaded to memory in a data acquisition system during movement of the recorders from behind the active patch to a location in front of the active patch.

BRIEF DESCRIPTION OF THE DRAWINGS

The invention, together with further advantages thereof, may best be understood by reference to the following description taken in conjunction with the accompanying drawings in which:

FIG. 4 is a plan view of a portion of a seismic survey showing the active listening points when two shot points are being vibrated in relatively close proximity; and FIG. 5 is a plan view of a portion of a seismic survey showing the inventive pattern of progression for a seismic source truck through the survey area.

DETAILED DESCRIPTION OF THE INVENTION

The following detailed description of various embodiments of the present invention references the accompanying drawings, which illustrate exemplary embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto to be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

Figure 1:
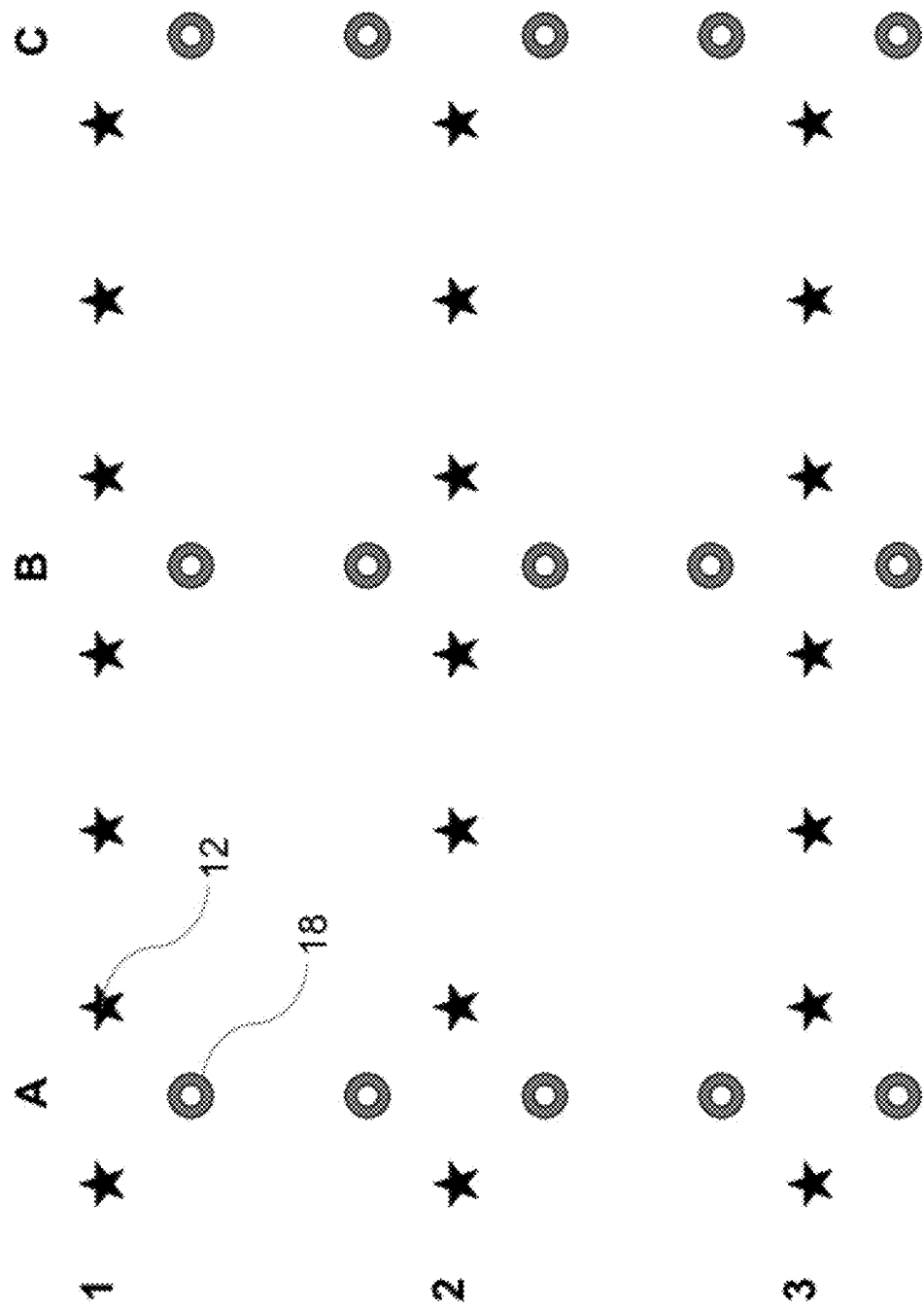
FIG. 1 is a plan view of a portion of a conventional seismic survey showing the relationship of shot points to listening points.

Referring now to FIG. 1, a small segment of a large seismic survey is illustrated where five-pointed stars indicate shot points 12 at which a source truck or vibe will come and emit a seismic signal into the ground. Emitting a seismic signal is sometimes euphemistically described as "shaking" or shaking the shot point. The hollow rings indicate listening points 18 at which geophones or receivers are positioned to record the seismic energy reflected back to the surface from underground structures. The listening points 18 are arrayed in receiver lines A, B and C, while shot points 12 are arrayed in source lines 1, 2 and 3. The space between receiver lines will be described as valleys and in the illustrated seismic survey includes three shot points on each source line within each valley. It should also be understood that shot point spacing and autonomous recorder spacing may be closer together along the source line and receiver line than the source line spacing and receiver line spacing. As such, each source line may include a number of shot points within a valley between two receiver lines. Similarly, more than one autonomous recorder may lay along a receiver line between two adjacent source lines. This arrangement is described as a 3 to 1 source to receiver line layout. At the same time, note that two listening points are located along each receiver line between two adjacent source lines. This arrangement is described as a 2 to 1 receiver to source line layout.

Figure 2:
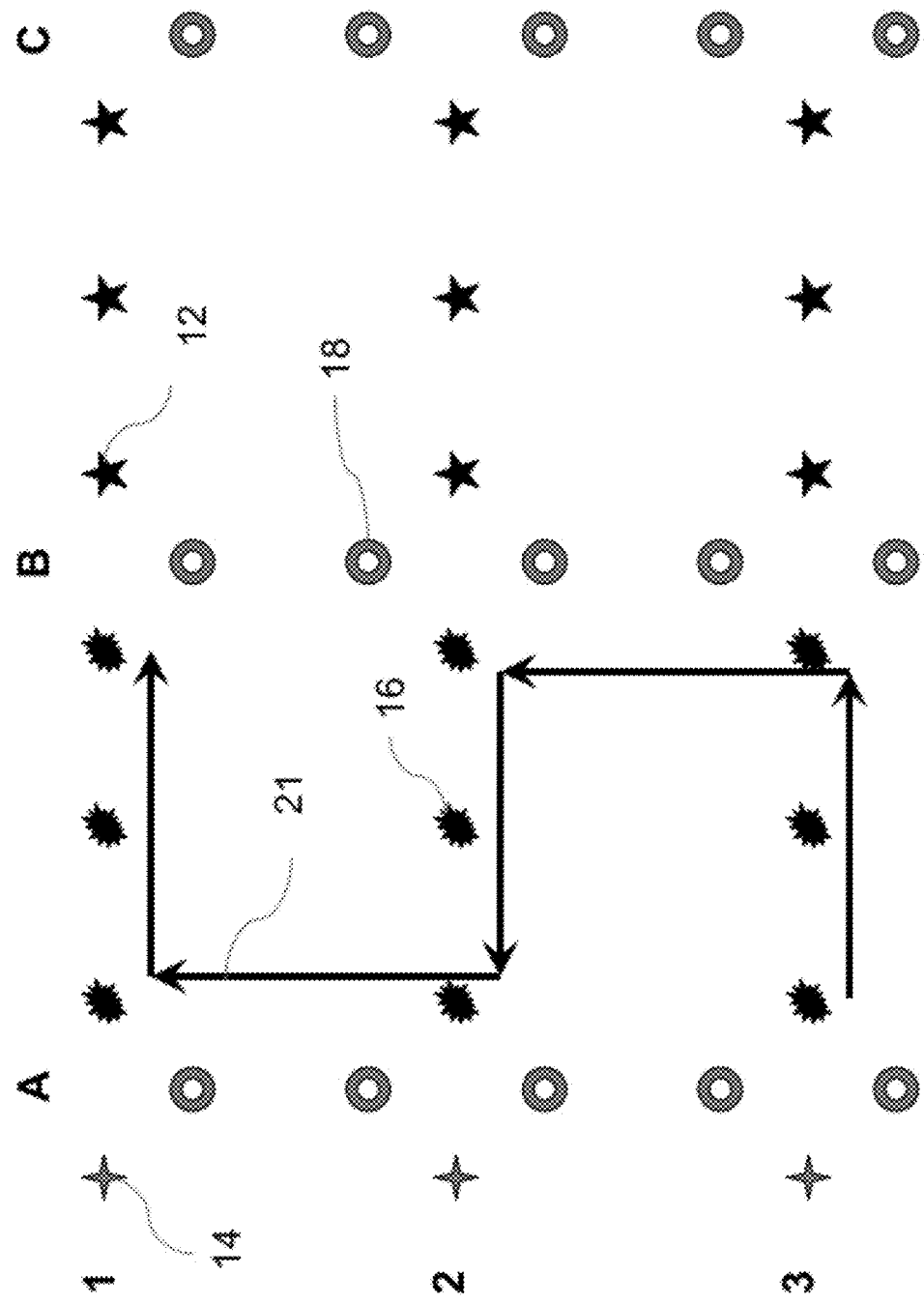
FIG. 2 is a plan view of a portion of a seismic survey showing a conventional pattern of progression for a seismic source truck through the survey area.

The conventional, prior art procedure for progressing through the survey is shown in FIG. 2 where one seismic source truck or vibe progresses from shot point to shot point along a path such as arrow 21 from one end of a valley (the space between two receiver lines) in a manner which does not cross a receiver line until the shot points in an entire valley have been shaken. Thus, in FIG. 2, the four pointed stars indicate shot points 14 that have already been shaken and multi-pointed stars indicate shot points 16 that are either currently being shaken or are expected to be shaken during a near term period such as a day. One of the problems with the current technique is that many recording stations sit idle for extended periods of time and issues of battery life could become significant due to running down the batteries when recording non-productive data. This would have significant impacts on data integrity and the quality of the final product.

Figure 3:
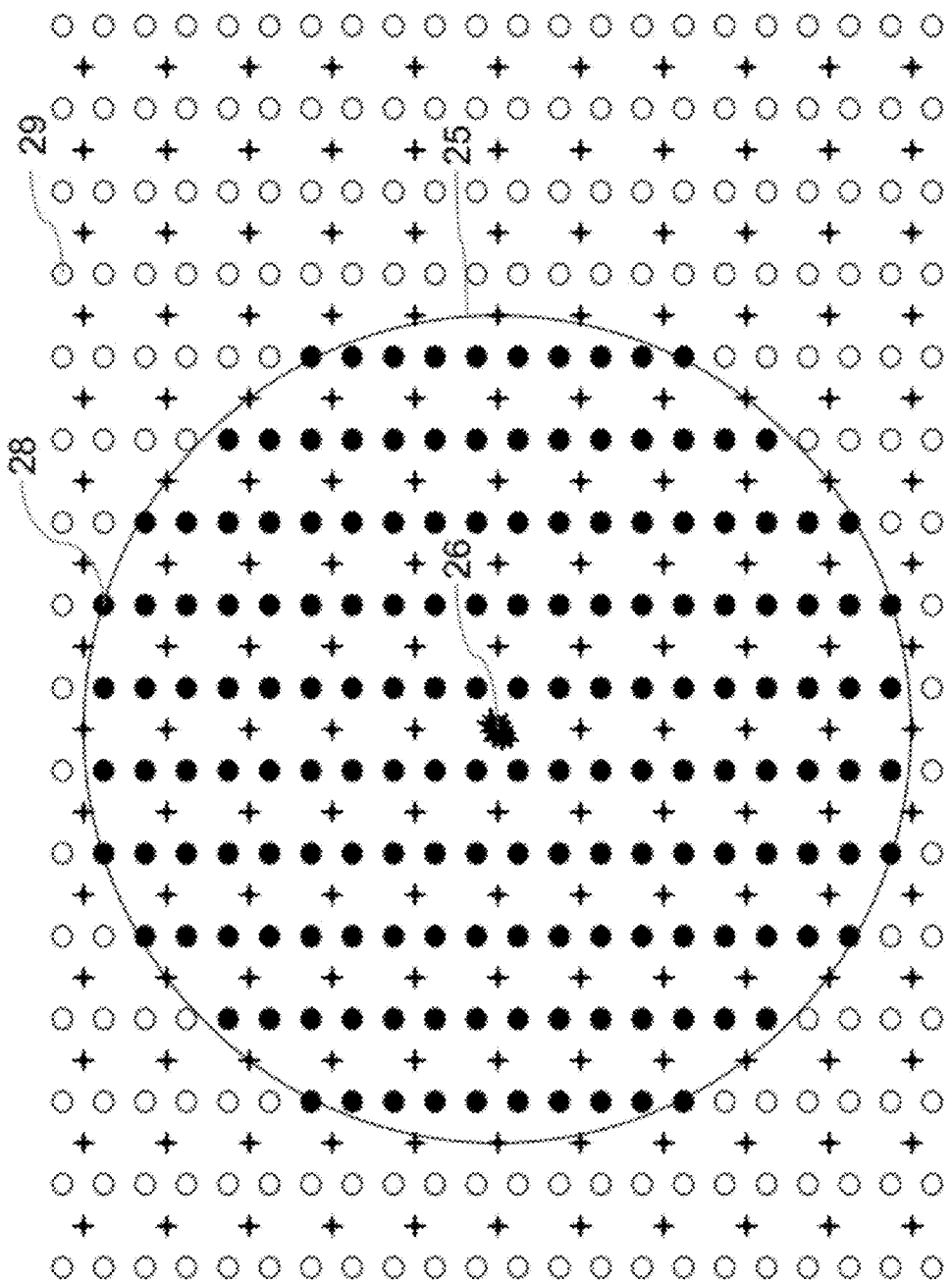
FIG. 3 is a plan view of a portion of a seismic survey showing the active listening points when a single shot point is being vibrated.

To better understand the present invention, it is helpful to understand that seismic energy is directed into the ground but meaningful data is typically acquired within a limited horizontal range from the shot point. While the range varies depending on a number of factors including the types of soil and rock in the ground, the range may extend for a few hundred yards to several thousand yards. The horizontal range is typically much less than the total area of the entire seismic survey. For an example of what this means and referring now to FIG. 3, a larger number of shot points and listening points are shown within a larger survey area. At the middle of circle 25 is a single shot point 26 on which a vibe or seismic source truck is located and shaking. For illustrative purposes, the extent of the circle 25 represents the range at which useful seismic energy is reflected from underground structures back to the surface. So, only autonomous recorders on listening points indicated with solid dots 28 receive recordable or useable data. Autonomous recorders on listening points indicated with open dots 29 do not receive useful data and, perhaps still recording, are essentially inactive in that whatever is recorded for the entire time that shot point 26 is being shaken is not useful and will be deleted early in the processing. In FIG. 4, an example is shown where two vibes are shaking at the same time where shot points 26A and 26B are being shaken and the active range is less circular and more elliptical.

With the range of the seismic energy extending in a generally circular pattern or a generally elliptical pattern, it should be recognized that all of the receiver points within range of the shot points being shaken or soon to be shaken should have a autonomous recorder installed and ready to record. Thus, for explaining the invention, the shot points that are being vibrated will be called "active shot points" and shot points that have already been shaken are called "completed shot points". Shot points that will soon be shaken will be called "active vibe patch" and shot points that will eventually be shaken but not for at least several days are called "future shot points."

Listening points that do not have autonomous recorders installed or located are "open listening points" and listening points with autonomous recorders installed are "filled listening points." Filled listening points that are within range of an active shot point is an "active listening point", a filled listening point that will soon be in range of an active shot point is a "forward filled listening point" and a filled listening point that was recently in range or recently an active recording point but is now out of range is a "rear filled listening point". As will be explained below, some listening points are active listening points for one or more active shot points, but will be out of range only temporarily while the source trucks move away and then become active listening points when a source truck moves to shot points that are again within range. These shot points will be called "standby listening points" and the standby listening points and the active listening points together comprise the "active listening patch." The active vibe patch progresses along a predefined path called a source path and the active listening patch progresses along a listening path. It should be noted that two adjacent source paths do not overlap while adjacent listening paths substantially overlap one another, sometimes by a significant margin.

When listening points in the active listening patch become rear filled listening points, the autonomous recorders installed in such points will soon be recovered and be processed for redeployment in front of the active listening patch to make a forward open listening point into a forward filled listening point. The processing of an autonomous recorder is essentially to have its data downloaded, its battery recharged and to be inspected and perhaps have other maintenance or diagnostics performed on it.

For the purposes of explaining the present invention, the most efficient use of autonomous recorders is to move the vibe or vibes from one shot point to the next in an active vibe patch pattern that keeps the deployed autonomous recorders in a geographical array that is substantially compact or that is in a low aspect ratio geometrical shape such as a square, a low aspect rectangle or low aspect ratio rounded rectangle. Aspect ratio is defined as the ratio of the longest transverse dimension of the geographical shape to the shortest dimension of the geographical shape. "Transverse" means essentially through the centerpoint of the active vibe patch. This is to avoid mis-identifying a low aspect ratio active patch as a high aspect ratio active patch. Take for instance an active patch that happens to have the shape of a tennis racket. This happens when the survey area includes inaccessible places such as a river or other structure or when an active patch at the edge of a survey area has an irregular edge boundary. In this case, the aspect ratio of the active patch is not measured across the "handle" of the tennis racket. The short dimension should be measured across the head of the racket and through the centerpoint of the racket. The dimension across the head, when compared to the long dimension from the end of the handle to the top end of the head of the racket would be much higher than a comparison of the dimension across the handle compared to the total length.

It should be recognized that there are neither compelling operational and geophysical reasons why a simple nominally square pattern of vibes is not the most effective nor the most desirable. In commonly owned patent application Ser. No. 11/677,438, filed Feb. 21, 2007, the inventors describe a more robust arrangement for the vibes that minimizes the interference patterns and the source generated cross talk. There are many factors that play into optimal separation of the vibes from an efficiency and geophysical quality standpoint. For the purposes of explaining the invention, we will assume a square pattern for the vibes.

Conducting a survey such that the active vibe patch has a low aspect ratio geographical array creates a compact area of listening points or active listening patch that will be active during the plan period. Assuming that the plan period is a 10 hour work day and that 100 shot points would be shaken during the ten hours, a survey may appear as illustrated in FIG. 5. The work day might begin with the listening points indicated by the bracket 41 being filled listening points (and only part of the active listening patch as some active and standby listening points are off the page) while bracket 43 indicates open listening points in front of the active listening patch. As the vibe moves first to shot point 31 to start shaking, autonomous recorders at rear filled listening points are recovered, processed and moved to the closest open listening points in the area indicated by bracket 43 to make those open listening points into forward filled listening points. The vibe or source would plan to follow the path as set forth by the series of arrows 45.

Notice that the vibe is crossing recording lines and not staying within the valley between two adjacent recording lines. Specifically, by following the path set forth by the arrows 45 leads the source truck to cross nine recording lines before progressing up to the next source line. Notice that as the seismic source truck moves across the area for the first plan shot points that active shot points at the left become standby listening points until the source truck works its way back across the recording lines. Filled listening points in the active listening patch basically do not become rear filled listening points or out of the active listening patch until the source truck moves up to the next source line. At that time, a row of active and standby listening points become rear filled listening points and the row is parallel to the source line. The entire row of autonomous recorders can be retrieved and processed and carried out to the front of the survey. As the survey progresses and the source trucks move along the source path, the active vibe patch and the active listening patch moves up the page. Notice that the source path has a width dimension being ten shot points wide or, in other words, having the left to right dimension of the series of arrows 45. At the same time, the width of the listening path is wider than the area of the survey shown in FIG. 5. Using the semi-circles 55A and 55B as an indication of the range of useful seismic signal, the listening path appears to be nineteen receiver lines wide. In other words, the width includes the nine receiver lines within the left to right travel of the source path, plus five additional lines on either side of the source path. At the end of the source path, less than the full width of the rear filled listening points may be retrieved as the need to have those same listening points be filled listening points as the source path progresses back in the opposite direction. Indeed, the about half of the listening points within the source path shown will be part of the active listening patch when the active vibe patch follows the source path back along either side of the shown source path. It should also be understood that the progression through a seismic survey may be altered based on many factors including crops in certain fields within the survey area and working around harvest or planting, working flood plains that are dry, or delaying work in flood plains with standing or moving water, and moving through or delaying portions of the survey to appease landowner needs or requests. As such, the source path may not take a back and forth arrangement, but may turn different directions at the ends of the survey area or even deviate in the middle of the survey area. Fundamentally, the present invention is about maintaining the autonomous, continuously recording seismic data recorders in a more compact active listening patch arrangement and directing the seismic source trucks to shake the various shot points in a progression through the survey area in a manner that requires fewer autonomous recorders.

In current systems, one point of distinction is that a line of autonomous recorders are laid out in a line and all the shot points in range of the autonomous recorders are shaken before the autonomous recorders are retrieved. In the present invention, autonomous recorders may be installed and retrieved in the same listening point twice or more times during a survey. This may require slightly more manpower assigned to the task of retrieving and deploying autonomous recorders, however, the security of keeping the recorders in closer range to the survey team (theft avoidance) and the need for fewer recorders in the field is anticipated to more than offset the additional manpower needs.

Focusing on the geometry of the recording points and plan shot points, if the work day were to begin with all of the recording points that would be active during the day to be filled, then the area in which the autonomous recorders would be deployed would be a very low profile rectangle (actually more likely a square) that would extend about half the diameter of the circle indicating the active range from all sides of the shot pattern for the day. However, for efficient deployment and use of autonomous recorders, personnel would be recovering and deploying autonomous recorders while the source trucks progress through the plan shot points and the autonomous recorders at rear filled listening points are picked up and carried to the front in a manner like the tracks of a bulldozer or a tank. Such track systems were originally called caterpillars and hence, the description of the present invention as a caterpillar-styled system. Such caterpillar tracks have a continuous series of segments that are lifted from the ground at the back of the vehicle, carried forward over the top of the wheels of the vehicle, and laid out in front of the wheels for the wheels of the vehicle to ride upon. The analogy in the present invention is that the autonomous recorders at the back of the survey are lifted and carried to the front of the survey as the survey progresses through a wide source path in the survey area. The entire survey area may be covered in a number of wide, back and forth paths as compared to far more, but very narrow paths that essentially follow the valleys in the current line or linear pattern of seismic data gathering. And in the current line or linear pattern, the autonomous recorders in the first line are not recovered until all the autonomous recorders are out of range and moved laterally forward in the survey. It should be noted that forward or front is intended to mean the general direction of the seismic source trucks while behind or back is also relative to the generally direction of the source trucks. So, as the source trucks move along the valleys in the conventional system, the additional seismic data recorders are installed laterally to the direction of the source trucks.

For comparison, if the arrangement shown in FIG. 5 were to have the number of autonomous recorders needed for an entire day of recording (assuming that the number of plan shot points is 100 in a pattern of ten by ten where the lines and shot points are commonly spaced and that the range of acquirable data is shown by circle 25), there would be minimal need of between 726 and 762 depending on how the team deals with the rounded corners of the active range. For comparison, a linear style would require ten active lines to be laid out for the full length of the recording lines, plus one line to be ready at the time of the turn at the end of the valley. If each valley were only 100 shot points in length, 1100 autonomous recorders would be needed. More than likely, the survey could extend such that the receiver lines are several miles in length and tens of thousands of autonomous recorders would be needed.

Since each survey is unique to the land upon which the data is being gathered, and surveys of the same land can be performed with considerably different layouts and source and receiver density, it is difficult, if not impossible to put quantitative numbers on the caterpillar style survey system. However, recognizing that it is preferred to keep the autonomous recorders and the plan shot points to low aspect ratio patterns versus the high aspect ratio prior art techniques. Aspect ratio, as described above, is the relationship or ratio of the longest horizontal surface dimension of the survey area to the shortest dimension of the survey area. A square area or circular area would have an aspect ratio of 1 to 1. A rectangle that is three times as long as it is wide would have an aspect ratio of 3 to 1. The prior techniques would have aspect ratios approaching 50 to 1 and going higher. The technique of the present invention would almost certainly utilize a geometric shape of less than ten to one, most likely stay below five to one and preferably be less than four to one, more preferably three to one and even more preferably be about two to one or less. It must be recognized that the description is an idealized system and does not take into account boundaries and efforts to equalize the width of the back and forth paths. For example, as shown in FIG. 5, the path width was ten shot points. It would not be ideal to create thirty ten shot point wide sweeps and finish with a path that is only three shot points wide. Clearly, several sweeps should be increased or decreased so that all of the paths have similar width. At the same time, surveys sometimes have difficult boundaries making equal division quite complicated. The principles of the present invention may still be applied to reduce the number of needed and deployed autonomous recorders while proceeding with the survey in a rapid progression.

Deploying the autonomous recorders in a low aspect ratio pattern and shaking the shot points in a series that creates an area of plan shot points that is also a low aspect ratio pattern provides short term deployment of the autonomous recorders which keeps a minimal amount of data on each autonomous recorder prior to being downloaded to more secure and reliable data storage systems, recharges the batteries well within the expected deploy or run time, and also keeps the autonomous recorders within a reasonably close proximity of the survey team. Periodically, in the conventional pattern of conducting a survey, the survey team may end up quite a distance from the autonomous recorders including being out of sight of some autonomous recorders for many hours or even days. In these circumstances, autonomous recorders can be taken or stolen, which is clearly a problem. While the cost for replacing the lost autonomous recorder is not insubstantial (on the order of several thousands of dollars), the cost for re-acquiring the lost data can easily extend into the hundreds of thousands of dollars in additional survey time.

In a preferred embodiment, the high fidelity vibration sources are operated in ConocoPhillips ZenSeis™ mode. ZenSeis is a technique for seismic data acquisition using a plurality of seismic sources. See e.g., U.S. Pat. No. 7,295, 490; U.S. Patent Publication Nos. 2010/0020641, 2010/000640, 2009/0116337 and 2008/0137476.

The autonomous, continuous seismic data recorders are commercially available from a number of companies including Oyo Geospace and Fairfieldnodal. For example, Oyo Geospace has the GEOSPACE SEISMIC RECORDER (GSR)™ and Fairfieldnodal Z-Land® are suitable autonomous data recorders.

Finally, the scope of protection for this invention is not limited by the description set out above, but is only limited by the claims which follow. That scope of the invention is intended to include all equivalents of the subject matter of the claims. Each and every claim is incorporated into the specification as an embodiment of the present invention. Thus, the claims are part of the description and are a further description and are in addition to the preferred embodiments of the present invention. The discussion of any reference is not an admission that it is prior art to the present invention, especially any reference that may have a publication date after the priority date of this application.

The invention claimed is:

1. A process for collecting seismic data for a survey area where source trucks shake shot points and autonomous, continuously recording seismic recorders record data at listening points, the process comprising:
   a) creating a geophysical survey layout for the survey area including defining individual locations for each of a plurality of shot points and each of a plurality of listening points;
   b) estimating the average number of shot points that will be shaken during a normal work day wherein the term active shot points means shot points that are currently being shaken and active source patch means a generally contiguous geographical array of shot points within the survey area that are expected to be shaken during a normal work day;
   c) selecting within the survey area, a series of vibe paths within which one or more source trucks are to progress from shot point to shot point through all of the shot points within the vibe path, and wherein listening paths comprise the listening points within the vibe path and on either side of the vibe path within range of shot points within the vibe path where useful, recordable seismic data may be recorded and active listening patch means the listening points within the listening path range of the active shot points and comprise listening points so that listening points in the active listening patch are receiving or will soon receive useful, recordable seismic data;
   d) deploying a plurality of autonomous, continuously recording seismic recorders to the active listening patch, wherein the plurality of the autonomous, continuously recording seismic recorders are arranged in a geographical array having an aspect ratio of less than 5 to 1, wherein the aspect ratio is defined as the ratio of the longest transverse dimension of the geographical shape to the shortest dimension of the geographical shape;
   e) retrieving autonomous, continuously recording seismic recorders that are behind the active listening patch; and
   f) re-deploying the retrieved autonomous, continuously recording seismic recorders to listening points in front of the active listening patch within the listening path while the one or more source trucks progress from shot point to shot point.

2. The process for collecting seismic data according to claim 1 wherein the active source patch and active listening patch move along with the source trucks along the respective vibe path and listening path.

3. The process for collecting seismic data according to claim 1 wherein the active source patch has an aspect ratio of less than four to one.

4. The process for collecting seismic data according to claim 1 wherein the active source patch has an aspect ratio of less than three to one.

5. The process for collecting seismic data according to claim 1 wherein the active source patch has an aspect ratio of less than two to one.

6. The process for collecting seismic data according to claim 1 wherein the active listening patch has an aspect ratio of less than three to one.

7. The process for collecting seismic data according to claim 1 wherein the receiver points are arranged in receiver lines and the source path requires that seismic source trucks cross receiver lines to move to the shot points in the active source patch.

8. The process for collecting seismic data according to claim 1 wherein the survey layout comprises more than a one-to-one receiver to source line layout.

9. The process for collecting seismic data according to claim 1 further comprising the step of downloading data stored in the memory of the autonomous seismic data recorders to memory in a data acquisition system during movement of the recorders from behind an active patch to a location in front of the active patch.

10. The process for collecting seismic data according to claim 9 further comprising the step of recharging a battery of one or more of the autonomous seismic data recorders in conjunction with the movement of the recorders.

* * * * *